US012412949B2

(12) United States Patent
Yebka et al.

(10) Patent No.: US 12,412,949 B2
(45) Date of Patent: Sep. 9, 2025

(54) HIGH-CAPACITY BATTERY CELL STACK

(71) Applicant: Lenovo (Singapore) Pte. Ltd., Singapore (SG)

(72) Inventors: Bouziane Yebka, Apex, NC (US); Tin-Lup Wong, Chapel Hill, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 109 days.

(21) Appl. No.: 17/391,960

(22) Filed: Aug. 2, 2021

(65) Prior Publication Data

US 2023/0033080 A1 Feb. 2, 2023

(51) Int. Cl.
*H01M 50/109* (2021.01)
*H01M 4/134* (2010.01)
*H01M 4/38* (2006.01)
*H01M 50/184* (2021.01)
*H01M 50/531* (2021.01)

(52) U.S. Cl.
CPC ......... *H01M 50/109* (2021.01); *H01M 4/134* (2013.01); *H01M 4/38* (2013.01); *H01M 50/184* (2021.01); *H01M 50/531* (2021.01); *H01M 2300/0065* (2013.01)

(58) Field of Classification Search
CPC .............................................. H01M 50/10–11
See application file for complete search history.

(56) References Cited

U.S. PATENT DOCUMENTS

| 3,223,555 | A | * | 12/1965 | Himy | H01M 50/463 |
| | | | | | 429/129 |
| 2004/0028997 | A1 | * | 2/2004 | Hayashi | H01M 10/0431 |
| | | | | | 429/185 |
| 2016/0315296 | A1 | * | 10/2016 | Kimura | H01M 50/124 |
| 2017/0092925 | A1 | * | 3/2017 | Shiu | H01M 10/0431 |
| 2019/0252648 | A1 | * | 8/2019 | Koyama | H01M 50/171 |
| 2019/0348718 | A1 | * | 11/2019 | Kawai | H01M 50/46 |
| 2020/0251767 | A1 | * | 8/2020 | Harrison | H01M 10/0585 |

FOREIGN PATENT DOCUMENTS

EP     3748755 A1 * 12/2020     ........ H01M 10/0427

* cited by examiner

*Primary Examiner* — Jonathan G Leong
*Assistant Examiner* — Katharine A Caughron
(74) *Attorney, Agent, or Firm* — Schwegman Lundberg & Woessner, P.A.

(57) ABSTRACT

A battery includes multiple aligned and stacked cells. Each cell includes a cathode layer having a cathode notch formed on a perimeter of the cathode layer and a cathode electrode extending from the perimeter of the cathode layer. Each cell also includes an anode layer having an anode notch formed on a perimeter of the anode layer and an anode electrode extending from the perimeter of the anode layer. The respective cathode and anode electrodes extend through the respective anode and cathode notches in the stacked cells to contact a battery case to form positive and negative contacts of the battery.

11 Claims, 5 Drawing Sheets

HIGH-CAPACITY BATTERY CELL STACK

BACKGROUND

Small battery powered electronic devices, such as smart watches, continue to be improved with greater functionality. These improvements lead to requirements for higher energy density batteries in more and more compact spaces. Coin type batteries are typically used, as they have low profiles and have been used in watches for many years. Increasing the energy density of such low-profile batteries without increasing the profile has been challenging.

SUMMARY

A battery includes multiple aligned and stacked cells. Each cell includes a cathode layer having a cathode notch formed on a perimeter of the cathode layer and a cathode electrode extending from the perimeter of the cathode layer. Each cell also includes an anode layer having an anode notch formed on a perimeter of the anode layer and an anode electrode extending from the perimeter of the anode layer. The respective cathode and anode electrodes extend through the respective anode and cathode notches in the stacked cells to contact a battery case to form positive and negative contacts of the battery.

DETAILED DESCRIPTION

In the following description, reference is made to the accompanying drawings that form a part hereof, and in which is shown by way of illustration specific embodiments which may be practiced. The drawings may not be to scale in order to better communicate the structures depicted, as well as the functions of such structures. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

A battery includes multiple stacked and aligned battery cells. The battery cells include alternating anode and cathode layers with notches in each type of layer aligned to permit passage of electrodes connecting the respective layers. The electrodes are coupled to a battery container to provide negative and positive terminals.

Figure 1A:
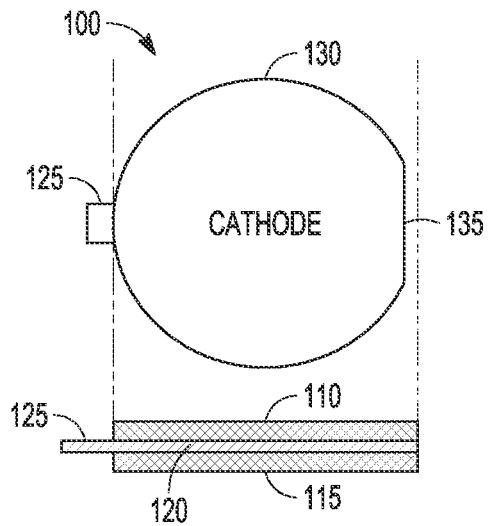
FIG. 1A is a plan and side view of a battery cell cathode according to an example embodiment.

FIG. 1A is a plan and side view of a battery cell cathode 100. Cathode 100 includes two cathode layers 110 and 115 sandwiching a cathode electrode layer 120. A portion 125 of the cathode electrode layer 120 extends from a perimeter 130 of the cathode 100.

In one example, the cathode 100 is round and disk shaped as shown. A notch 135 is formed by cleaving or otherwise removing a portion of the cathode from a perimeter 140 of the cathode 100. The notch 135 may be formed opposite the portion 125 of the cathode electrode layer 120.

The cathode layer 110 and 115 may be formed of cobalt, nickel, and manganese or other suitable material for a cathode of a battery cell. The cathode electrode layer 120 may be formed of aluminum or other suitable material. Materials used may be the same as, or similar to, materials used for single cell batteries and may be selected to make the battery cell rechargeable or not.

Figure 1B:
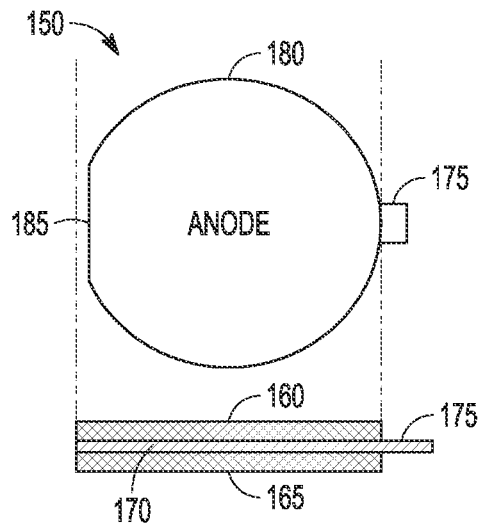
FIG. 1B is a plan and side view of a battery cell anode according to an example embodiment.

FIG. 1B is a plan and side view of a battery cell anode 150. Anode 150 includes two anode layers 160 and 165 sandwiching an anode electrode layer 170. A portion 175 of the anode electrode layer 170 extends from a perimeter 180 of the anode 150.

In one example, the anode 150 is round and disk shaped as shown. Such a disk shape is useful for forming coin type form factor batteries or other cylindrical shaped batteries. Other shapes may be used, such as square, rectangular, oval, or any shaped polygon.

A notch 185 is formed by cleaving or otherwise removing a portion of the anode from a perimeter 190 of the anode 150. The notch 185 may be formed opposite the portion 175 of the anode electrode layer 170. As shown in FIG. 1A and FIG. 1B, the notch is a straight line cutting through an arc of the anode 150, or similarly, the cathode 130.

The anode layer 160 and 165 may be formed of zinc or lithium or other suitable material for a cathode of a battery cell. The cathode electrode layer 120 may be formed of aluminum or other suitable material.

Figure 1C:
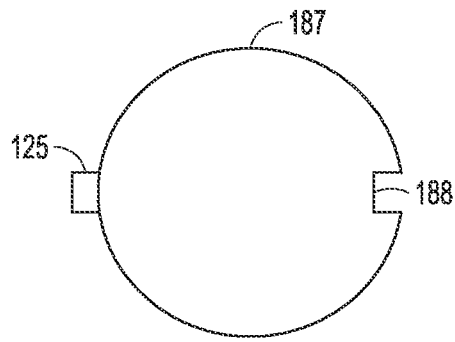
FIG. 1C is a plan view of an alternative cathode having a rectangular shaped notch according to an example embodiment.

FIG. 1C is a plan view of an alternative cathode 187 having a rectangular shaped notch 188 cut into a portion of the perimeter of the cathode 187. The notch 188 may be sized to allow passage of anode electrode portions in a stack of cells comprised of anodes and cathodes. Notch 188 is shown opposite the portion of the cathode electrode but may be located anywhere on the perimeter of the cathode 187 to permit passage of anode electrode portions in the stack. Notches for anodes may be similar.

Figure 1D:
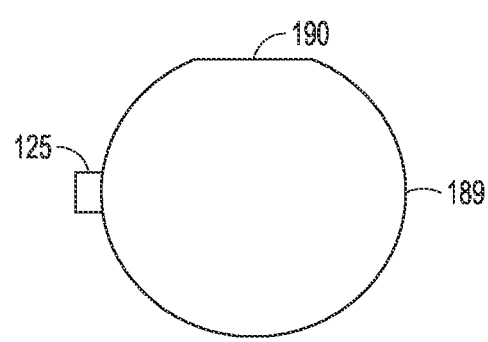
FIG. 1D is a plan view of a further alternative cathode showing a notch at a 90-degree angle on the perimeter of the cathode from a portion of a cathode electrode according to an example embodiment.

FIG. 1D is a plan view of a further alternative cathode 189 showing a notch 190 at a 90-degree angle on the perimeter of the cathode 189 from the portion of the cathode electrode 125. Anodes may have similar shapes that when aligned properly, allow passage of the respective electrode portions along the perimeter of the stack.

Figure 1E:
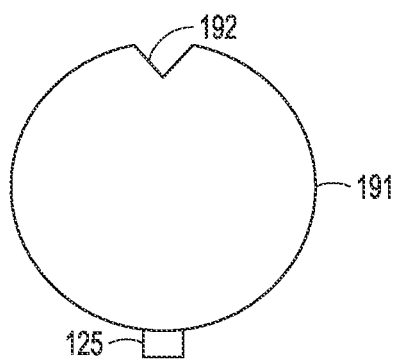
FIG. 1E is a plan view of a further alternative cathode having a triangular shaped notch according to an example embodiment.

FIG. 1E is a plan view of a further alternative cathode 191 having a triangular shaped notch 192 formed in a portion of the perimeter of the cathode 191.

Figure 1F:
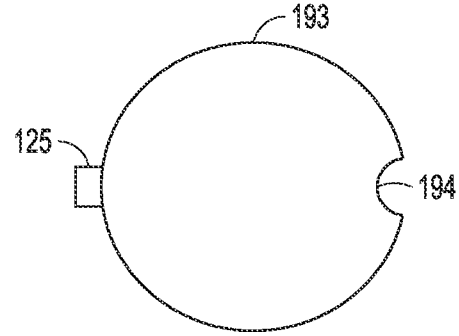
FIG. 1F is a plan view of a further alternative cathode having an arc shaped notch according to an example embodiment.

FIG. 1F is a plan view of a further alternative cathode 193 having an arc shaped notch 194 creating a concave shape into the cathode 193 perimeter.

Figure 2:
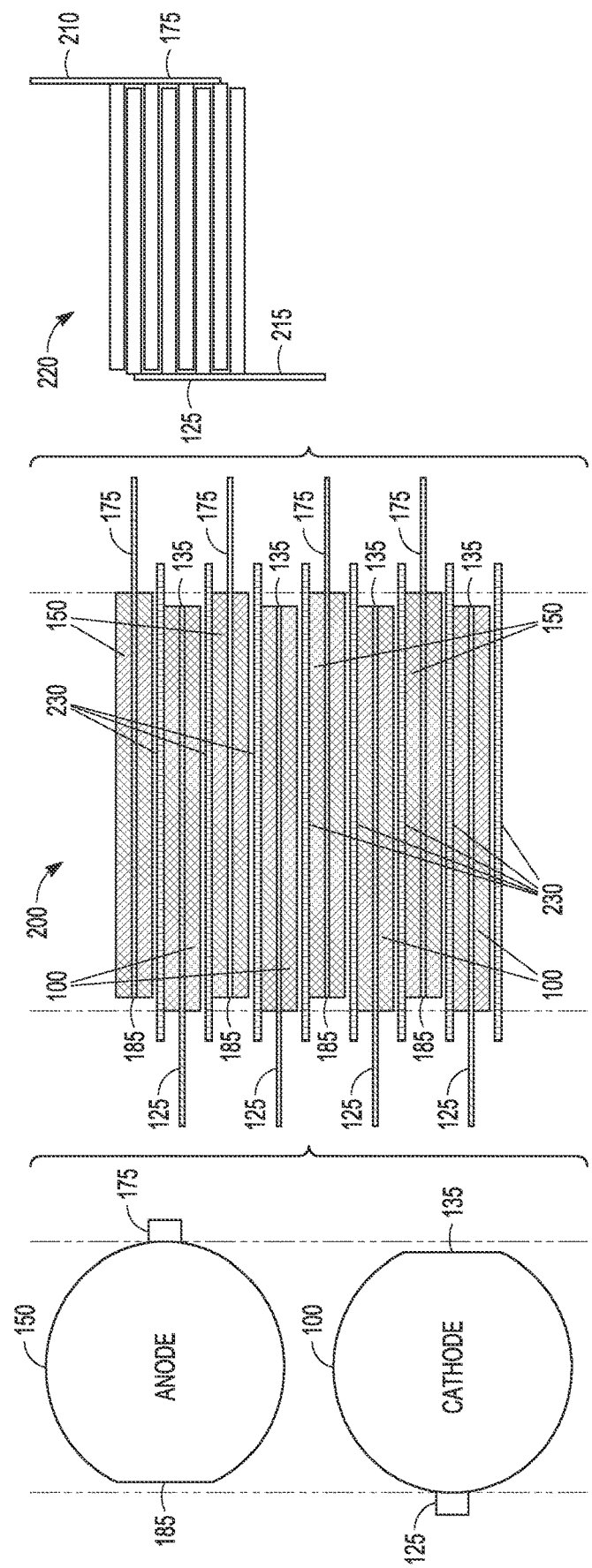
FIG. 2 is block diagram illustrating assembly of a stack of battery cells according to an example embodiment.

FIG. 2 is block diagram illustrating assembly of a stack of cells 200. Reference numbers for layers is consistent with the corresponding reference numbers in FIG. 1. The stack 200 is formed using multiple cells comprised of alternating cathodes 100 and anodes 150. Each of the cathodes have their notches 125 aligned in a vertical stack with the orientation of the stack 200 as shown in FIG. 2. The cathode electrode portions 125 are also aligned. Similarly, each of the anodes have their notches 275 aligned in the vertical stack. The anode electrode portions 175 are also aligned. That the cathode electrode portions 125 are also aligned with the anode notches 185 and the anode electrode portions 175 are aligned with the cathode notches 135 in the stack 200.

The alignments allow the gathering of the respective sets of electrode portions through the respective notches, with the anode electrode portions 175 shown gathered at 210 and the cathode electrode portions 125 shown gathered at 215. A simplified version of the stack is shown at 220 to illustrate the connections. The gathered electrodes 210 and 215 may be obtained by extending the electrode portions 125 and 175 far enough to contact other respective electrode portions and later make contact with a container for the cells at positive and negative portions of the container to form a button type battery. In a further example, the gathered electrode portions may be gathered via an additional electrode portion electrically coupled to the extended electrode portions.

Each anode and cathode are separated by a separation layer 230. The separation layer has the same general shape as the anode and cathode layers but extends beyond such layers to help space the anode and cathode layers from sides of a battery container when. The electrode portions, when gathered and extending through the notches, may displace the separation layers 230.

Stack 200 is shown with five sets of anodes and cathodes, referred to as battery cells. The stack 200 may include fewer or more cells in further examples. Each cell is also separated by one of the separation layers 230 with a bottom layer being a cathode 100 and the bottom of the stack 200 including a final separation layer 230.

Figure 3:
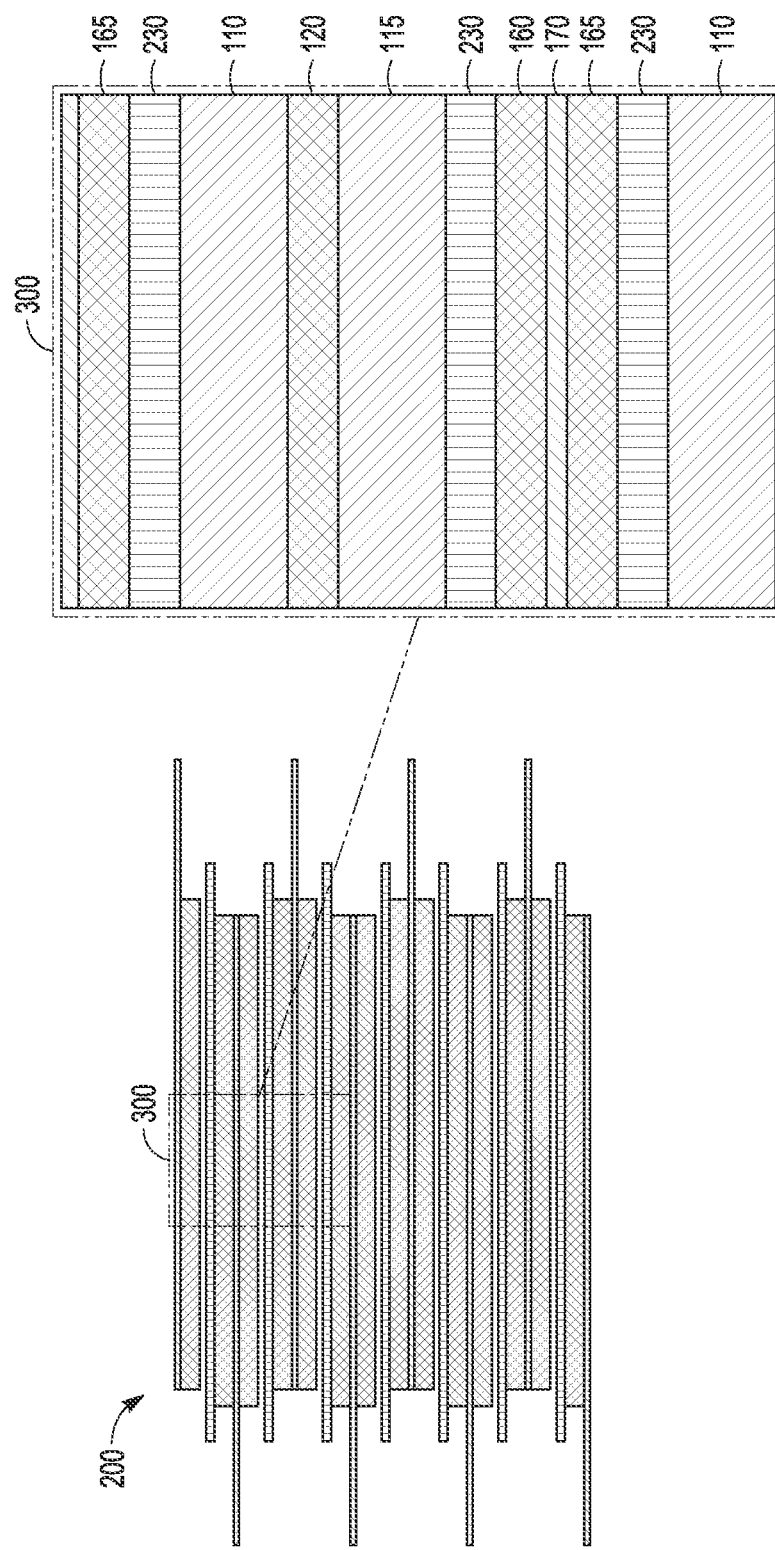
FIG. 3 is a cross section of a portion of the stack of cells with further detail shown in an expanded view of a portion according to an example embodiment.

FIG. 3 is a cross section of a portion of the stack of cells 200 with further detail shown in an expanded view of a portion 300. Cathode electrode 120 operates as a current collector and is shown coated on both sides with cathode material 110 and 115. Similarly, anode electrode 150 operates as a current collector for the anode layers 160 and 165 coating the anode electrode 150. The separator layers 230 include an electrolyte to facilitate current flow between the anode and cathode layers.

Figure 4:
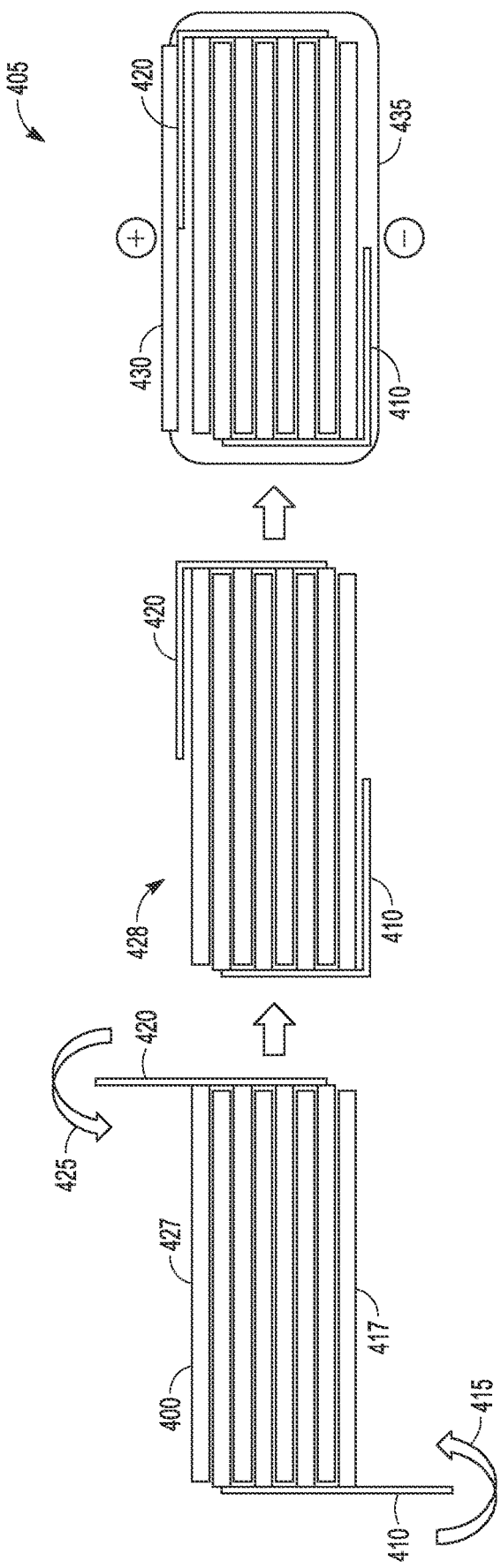
FIG. 4 illustrates assembly of a fuel cell stack into a battery case according to an example embodiment.

FIG. 4 illustrates assembly of a fuel cell stack 400 into a battery case 405. The stack 400 includes an extended anode electrode 410 and an extended cathode electrode 420. The anodes and cathodes are represented as blocks, with anode and cathode electrodes being gathered and respectively electrically connected to the extended anode electrode 410 and extended cathode electrode 420. The anode electrodes and extended anode electrode 410 traverse the stack downward, aligned with corresponding cathode electrode notches as previously described. Similarly, the cathode electrodes and extended cathode electrode 420 traverse the stack upward, aligned with the corresponding anode electrode notches.

Arrows 415 and 425 illustrate that the extended anode electrode 410 and extended cathode electrode 420 are each bent over the respective bottom 417 and top 427 of the stack 400. The positions of the extended anode and cathode electrodes after bending are shown at a stack 428. In one example, the extended electrodes extend about half-way across the respective tops and bottoms. In further examples, the extended electrodes extend a sufficient distance across the respective top and bottom of the stack 428 to allow sufficient electrical contact with the battery case 425.

The battery case 405 includes a cathode case 430 that is electrically coupled to the extended cathode electrode 420 to provide a positive terminal and an anode cap 435 that is electrically coupled to the extended anode electrode 410 to provide a negative terminal of the battery 405. The cathode case 430 and anode cap 435 are separated from each other by an annular insulating gasket as shown in further detail in FIG. 5. The battery case 405 may be in the shape of coin type of battery, or any other form desired. The gasket is mainly used to isolate the electrodes and to seal the case. Four cells comprising pairs of anode and cathode layers are shown in this example battery case 405. Any number of cells that can be fit in a selected volume may be used in further examples.

Figure 5:
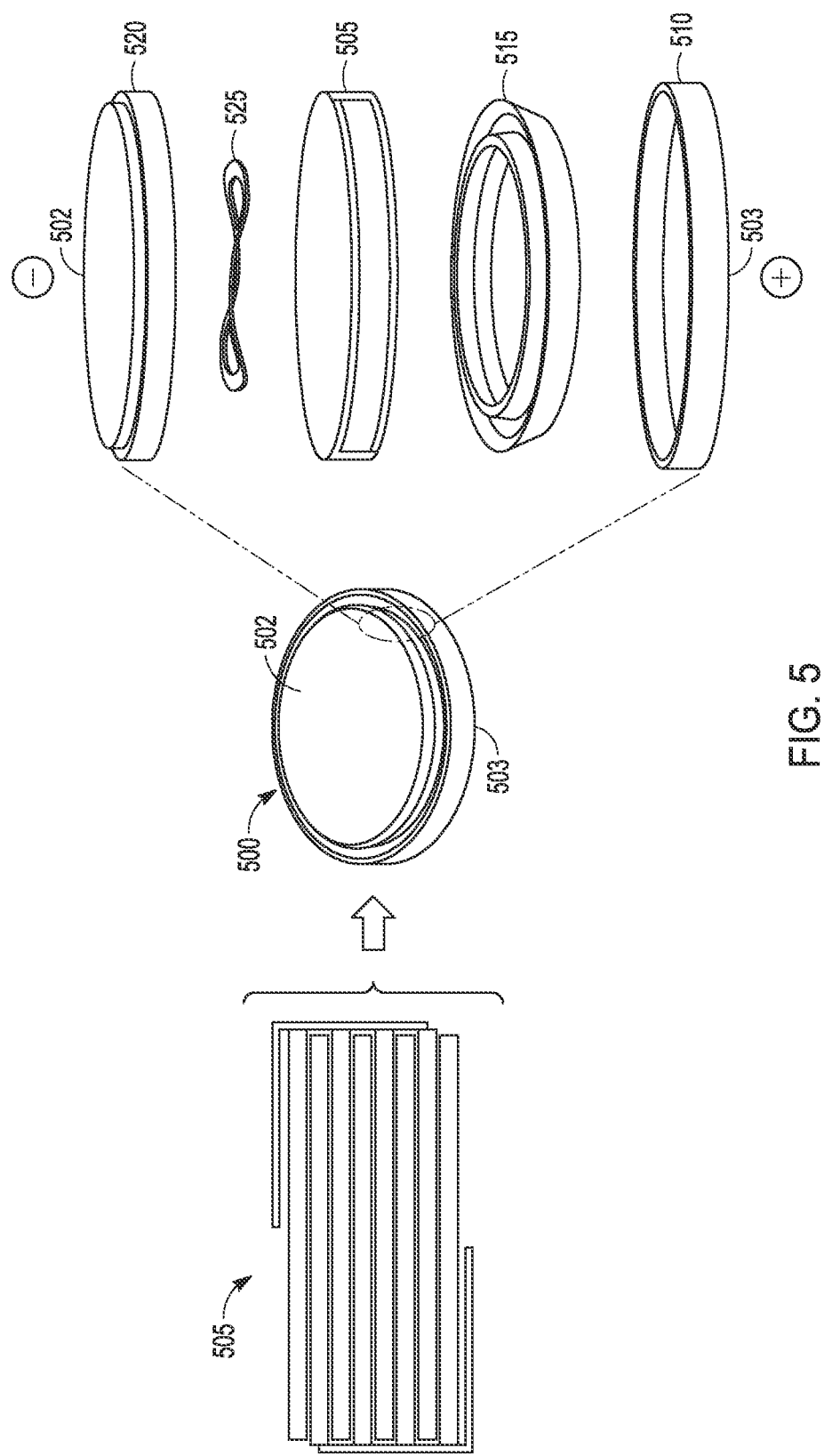
FIG. 5 is a block flow diagram illustrating assembly of a coin cell form factor battery according to an example embodiment.

FIG. 5 is a block flow diagram illustrating assembly of a coin cell form factor battery 500, so named because the battery 500 has the shape of a coin having a top and a bottom. As shown in FIG. 5, the top of battery 500 is a negative contact 502 and the bottom of battery 500 is a positive contact 503. A stack 505 of electrode and notch aligned anode and cathode layers is inserted into a cathode case 510 with a gasket 515 surrounding the perimeter of the stack 505.

The gasket 515 may be a standard gasket that has a "U" or "V" shaped cross section sized to engage with a perimeter of a cap 520 that nests within the case 510. The gasket 515 is used to form an electrically insulating layer between the case 510 and cap 520 as well as to prevent sides of the stack 505 from electrically contacting the cap 520.

A spring 525 may be disposed between the cap 520 and the top of the stack 505 to ensure the layers of the stack maintain physical contact with each other. Spring 525 may be any type of spring commonly used in coin type batteries, such as a wave washer as shown.

The extended anode electrode 410 is electrically coupled to the cap 520, and extended cathode electrode 420 is electrically coupled to the case 510, providing the battery 500 with the negative contact 502 and the positive contact 503.

The use of the same materials for the anodes and cathodes as in prior coin type batteries, and connecting the respective anodes and cathodes in the multiple cells in the stack provides a coin type battery with the same voltages as prior coin type batteries, as the connections are made in parallel. Other connections may be made, such as coupling cells in series to provide other voltages. By stacking multiple cells within the same form factor as single cell coin batteries, the energy storage can be enhanced. A significant increase in milliamp hours (mAh) has been estimated for batteries having similar volumes. Some typical form factors include R2012 (Volume 376 mm$^3$), 417CR2016 (Volume 502 mm$^3$), CR2020 (Volume 628 mm$^3$), CR2025 (Volume 785 mm$^3$), and CR2040 (Volume 1256 mm$^3$). Such form factors containing the stacks described herein show up to four times the capacity as single cell batteries in the same form factor or more.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A battery comprising:
   multiple aligned and stacked cells, each cell comprising:
   a round cathode layer having a single cathode notch formed on a perimeter of the round cathode layer and a cathode electrode extending from the perimeter of the cathode layer angularly spaced from the single cathode notch;
   a round anode layer having a single anode notch formed on a perimeter of the round anode layer and an anode electrode extending from the perimeter of the anode layer angularly spaced from the single anode notch; and
   a round separator layer disposed between the anode layer and the cathode layer, the round separator layer having a perimeter extending beyond the perimeters of the round cathode layer and the round anode layer;
   a round cathode case having a perimeter coupled to each cathode electrode extending along the multiple stacked cells via the anode notches;
   a round gasket disposed within the case such that the cells nest within the round gasket; and
   a round anode cap coupled to each anode electrode extending along the multiple stacked cells via the cathode notches, the round gasket forming an electrically insulating layer between the case and cap and preventing sides of the stacked cells from electrically contacting the cap, wherein the cathode electrodes are gathered to extend through the anode notches and the anode electrodes are gathered to extend through the cathode notches, displacing corresponding portions of the round separator layers that extend beyond the perimeters of anode and cathode layers.

2. The battery of claim 1 wherein the anode and cathode notches have a size sufficient to enable the respective electrodes to be electrically coupled to the cathode case and anode cap.

3. The battery of claim 1 wherein the cells are round, and the anode and cathode notches comprise cleaved portions of the anode and cathode layers.

4. The battery of claim 1 wherein the cathode electrodes are sandwiched between cathode material and the anode electrodes are sandwiched between anode material.

5. The battery of claim 1 wherein the cathode electrode comprises aluminum and the anode electrode comprises copper.

6. The battery of claim 1 wherein the anode cap is nested within an inner perimeter of the cathode case and is separated from the cathode case by the round gasket, and further comprising a spring disposed between the cap and a top of the stacked cells.

7. The battery of claim 6 wherein the round gasket has a u-shaped cross section and also separates the cells from an inner perimeter of the anode cap.

8. The battery of claim 1 wherein the separator comprises an electrolyte.

9. The battery of claim 1 wherein the cells are coupled in parallel by the respective cathode and anode electrodes.

10. A battery cell comprising:
    multiple stacked and aligned cells, each cell comprising:
    a cathode layer having a cathode notch formed on a notch portion of a perimeter of the cathode layer and a cathode electrode extending from the perimeter of the cathode layer separate from the notch portion;
    an anode layer having an anode notch formed on a notch portion of a perimeter of the anode layer and an anode electrode extending from the perimeter of the anode layer separate from the notch portion; and
    a separator layer including an electrolyte, disposed between the anode layer and the cathode layer, the separator layer having a perimeter extending beyond the perimeters of the cathode layer and the anode layer, wherein the anode electrode and anode notch are angularly spaced from each other, and wherein the cathode electrodes are gathered to extend through the anode notches and the anode electrodes are gathered to extend through the cathode notches, displacing corresponding portions of the separator layers that extend beyond the perimeters of anode and cathode layers.

11. The battery cell of claim 10 wherein the anode notch and the cathode notch have a size sufficient to enable the respective electrodes to be electrically coupled to a cathode case and anode cap.

* * * * *